United States Patent
Käch

[11] 4,027,153
[45] May 31, 1977

[54] FIBRE NETWORK HAVING A PASSIVE OPTICAL COUPLING ELEMENT FOR OPTOELECTRONIC TRANSMISSION OF DATA BETWEEN ADDRESSABLE SUBSCRIBER STATIONS

[75] Inventor: Alfred Käch, Untersiggenthal, Switzerland

[73] Assignee: Patelhold Patentverwertungs- und Elektro-Holding AG, Glaurus, Switzerland

[22] Filed: Nov. 18, 1974

[21] Appl. No.: 524,710

[30] Foreign Application Priority Data
Nov. 28, 1973 Switzerland .............. 16683/73

[52] U.S. Cl. .............................. 250/199; 250/227; 350/96 WG
[51] Int. Cl.² ......................................... H04B 9/00
[58] Field of Search ................. 250/199, 227; 178/DIG. 2; 350/96 B, 96 WG; 325/55, 64

[56] References Cited
UNITED STATES PATENTS

| | | | |
|---|---|---|---|
| 3,845,293 | 10/1974 | Borner | 250/199 |
| 3,870,396 | 3/1975 | Racki et al. | 350/96 WG |
| 3,870,398 | 3/1975 | Love | 350/96 WG |
| 3,874,773 | 4/1975 | Thiel | 350/96 WG |
| 3,874,780 | 4/1975 | Love | 350/96 WG |
| 3,874,781 | 4/1975 | Thiel | 350/96 WG |
| 3,883,217 | 5/1975 | Love et al. | 350/96 WG |
| 3,883,223 | 5/1975 | Hudson | 350/96 WG |

Primary Examiner—Benedict V. Safourek
Assistant Examiner—Michael A. Masinick
Attorney, Agent, or Firm—Frank L. Durr; Orville N. Greene

[57] ABSTRACT

A fibre network is disclosed for the optoelectronic transmission of data between and among a plurality of subscriber stations, each station having a transmitter and a receiver. A specific address code is allocated to each transmitter and its associated receiver, and the information content of the individual subscriber stations is sampled cyclically by a common addressing unit. The fibre network has $n$ junction points, whereby $n \geq 1$, and the individual fibre conductors lead from these junction points to the connected subscriber stations, in which the junction points contain passive coupling elements in the form of a solid, light-conducting core having opposing end faces. The fibres leading from the transmitters and from the addressing unit to a junction point are optically connected to one end face of a coupling element, and the outgoing fibres leading to the receivers are optically connected to the opposite end face of the coupling element. The length of the coupling element is such that the active surface area of the light-transmitting fibres coupled to the coupling element are individually capable of fully illuminating all of the receiver fibres connected to the opposite end face of the coupling element.

In an alternative embodiment, the fibres leading from both transmitters and receivers are optically connected to the same face of the coupling element, whose opposite end face is provided with a reflective (i.e. mirror) surface.

16 Claims, 4 Drawing Figures

FIBRE NETWORK HAVING A PASSIVE OPTICAL COUPLING ELEMENT FOR OPTOELECTRONIC TRANSMISSION OF DATA BETWEEN ADDRESSABLE SUBSCRIBER STATIONS

The invention concerns a fibre network for the optoelectronic transmission of data between an arbitrary number of subscriber stations, such that the network allows the transfer of data between any stations, each station having a transmitter and a receiver, a specific address code is allocated to each transmitter and its associated receiver, and the information content of the individual subscriber stations is sampled cyclically by a common addressing unit, such a network having $n$ junction points, whereby $n \geq 1$, and individual fibre conductors lead from these junction points to the connected subscriber stations.

BACKGROUND OF THE INVENTION

A fibre network of this kind is the subject of an earlier Swiss Pat. application, No. 8346/73, filed by the present applicant, in which application it was presumed that the fibre conductors leading from the individual subscriber stations to the common junction point exhibit relatively high attenuation, so that an amplifier is necessary at least at the junction point. The junction points according to the earlier application are therefore in the form of repeaters, a very practical arrangement from the circuitry standpoint, and one which also conveniently solves the problem of distributing the signal. Recent developments in the field of fibre technology show, however, that glass fibres with outstandingly low attenuation can be made (e.g. 3-4 dB/km). With these, the repeaters, which despite their advantages are costly and with regard to reliability are not always completely dependable, can be dispensed with over relatively short transmission distances of not more than about 1 km, and the remaining attenuation (interface attenuation, fibre attenuation) can then be effectively overcome with the aid of the transmitting power of the individual subscriber stations. In view of this, network structures can be much simpler and more reliable.

OBJECTS AND BRIEF DESCRIPTION OF THE INVENTION

It is thus an object of the invention to create a fibre network of the kind described above with $n$ junction points, without incorporating active components in the form of repeaters in the junction points, and at the same time satisfactorily resolving the question of signal distribution. This object is achieved in that the junction points contain a passive coupling element in the form of a solid, light-conducting core, the fibres leading from the transmitters of the subscriber stations and from the addressing unit to the junction point are optically connected to one end face of this coupling element, and the outgoing fibers leading to the receivers of the subscriber stations are optically connected to the other end face of this coupling element, and wherein the relationship of the length of the coupling element to the active surface area of the light-transmitting channels coupled to the element is such that the end face to which the receiver fibres are connected is fully illuminated by the light beam from each transmitting fibre.

BRIEF DESCRIPTION OF THE FIGURES

The invention is explained more fully below with reference to the drawings 1-3, in which.

DETAILED DESCRIPTION OF THE INVENTION

Figure 1:
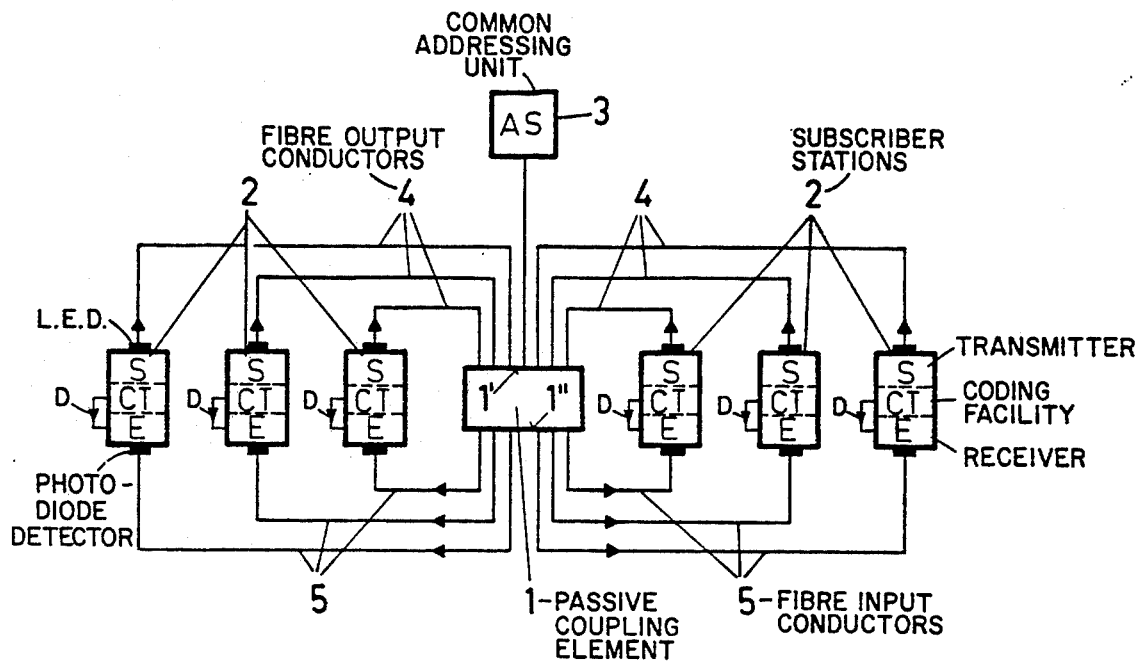
FIG. 1 is a block diagram showing a fibre network with a common passive coupling element in accordance with the invention, and a number of subscriber stations.

In FIG. 1, the number 1 denotes the common, passive coupling element, 2 a number of subscriber stations (six are shown symbolically), each comprising a receiver E, a transmitter S and a coding facility CT, and 3 denotes a common addressing unit AS. The transmitters of the stations 2 and of the addressing unit 3 are each connected optically via fibre conductors 4 to the end face 1' of coupling element 1.

The receivers of the stations 2 receive both addresses cyclically generated by the addressing unit and information generated by the subscriber stations. When an address code is emited by the addressing unit, it always passes through coupling element 1 and along the fibre conductors leading to all the recievers. As soon as the called transmitter starts to operate, its associated address receiver is disconnected via line O so that no feedback phenomena can occur. The information sent out by the transmitter of one station also passes via coupling element 1 to all the receivers, but is accepted only by the station programmed to the same address. If certain stations are intended only to recieve, the transmitter in these cases can be omitted. Conversely, if a station is intended only to transmit, its receiver can be omitted. The numbers of fibre conductors arriving at, and departing from, coupling element 1 can thus be quite different.

Figure 2:
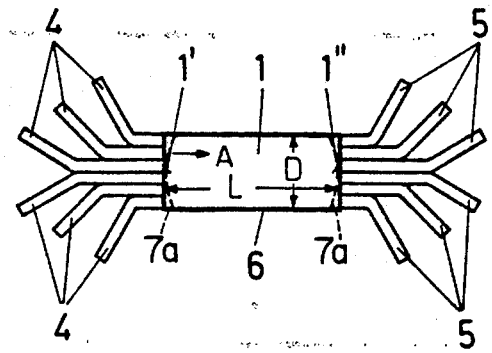
FIG. 2 shows the structure of a passive coupling element in accordance with the invention.

The construction of coupling element 1 is shown schematically in more detail in FIG. 2. It comprises essentially a solid cylindrical shaped glass core 1, the end faces of the incoming fibre conductors 4 and the outgoing fibre conductors 5 (six of each are shown symbolically) being optically matched to its end faces 1' and 1". The diameter D of the core is governed by the total area of the fibre conductors connected to end face 1' or 1". The length L must be dB that the light from each fibre 4 incident on surface 1' is distributed as uniformly as possible among all the fibres 5 in plane 1". Owing to the directional characteristic of the fibre ends, all the fibre conductors are mutually decoupled on the transmitter side (and also on the receiving side). Coupling exists only in the direction of radiation A of the light, i.e. always between one fibre on the input side and dB, fibres on the output side (beam divider). In order to avoid light losses along the coupling element, the outer surface 6 of core 1 can be provided with a mirror surface or coated with a layer of glass having a refractive index somewhat lower than that of the body of the core 1. The light distribution along the core 1 can be made even more uniform by dishing the end faces 1' and 1" slightly with increasing radius.

The division of power in the coupling element 1 gives rise to interface attenuation. With a basic attenuation of 1 dB/fibre end, this amounts to about 12 db with 10 subscriber stations, for example, and some 20 dB with 50 stations. To this must be added the transmission losses LED/fibre and fibre/photodiode, as well as losses in the fibres themselves (LED meaning light emitting diode). Assuming low-attenuation fibres, with 50 subscriber stations and fibre lengths up to 1 km, for example, this gives a total transmission attenuation of some 30–40 db, which in relation to the available transmitting power of a subscriber station is quite within acceptable limits.

Figure 3:
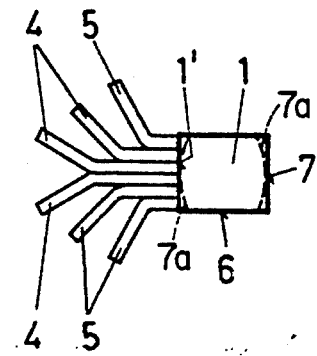
FIG. 3 is a variant of the passive coupling element with a reflective surface at one end face.

Instead of the transmitter and receiver fibres leading separately to the coupling element, as shown in FIG. 1, if circumstances so require the fibre conductors of neighboring stations can be combined into one on the transmitting and/or receiving sides, or the transmitter and receiver of one station can be linked via a single fibre. The ends of a fibre adjacent the transmitter and receiver of the same station would have to be split in a Y shape, after the manner of the beam divider described above, to separate optically the transmission and reveiving paths. If the incoming and outgoing conductors of each station are combined in a single fibre, the ends of the transmitter fibres attached to end face 1' of coupling element 1 are at the same time the inputs of the receiver fibres, as shown in FIG. 3. In order that the receiver fibres are fully illuminated by each transmitter fibre, the opposite end face 1" must be in the form of a mirror 7, and appropriately dished as shown by the broken lines at 7a, if necessary. The power division, and hence the transmission attenuation of the coupling element, remains virtually the same as with the fibre coupling arrangement depicted in FIG. 2. The Y-connection, however, causes an increase in attenuation of at least 3 dB, at least in the transmitting direction, but on the other hand, the total number of fibre conductors is halved.

A final possibility, which is mentioned here only incidentally, is to provide each transmitter and receiver with a separate fibre and attach all the transmitter and receiver fibres to the same end face, instead of to the opposite ends of the coupling element 1 as shown in FIG. 1 and FIG. 2, and to provide the other end face with a mirror surface, as above in the case of common fibres for transmitter and receiver (of FIG. 3), possibly also dishing this face as shown in broken line at 7a, as requred. Each transmitter fibre will hen illuminate not only all the receiver fibres, but also all the transmitter fibres. The optically effective receiving area is then only half that of the coupling element, which is equivalent to further attenuation of 3 dB. On the other hand, the coupling element is only half as long, and illumination of the fibre ends can more easily be made homogeneous.

There is a fundamental difference between the coupling elements shown in FIGS. 2 and 3. Whereas the element in FIG. 2 acts both as a beam divider and as a power divider, only division of power takes place in the element of FIG. 3. In order to obtain an optically symmetrical Y-type coupling element, for example, it is necessary to combine three elements of the kind shown in FIG. 2, while one element is sufficient with the configuration shown in FIG. 3.

Figure 1A:
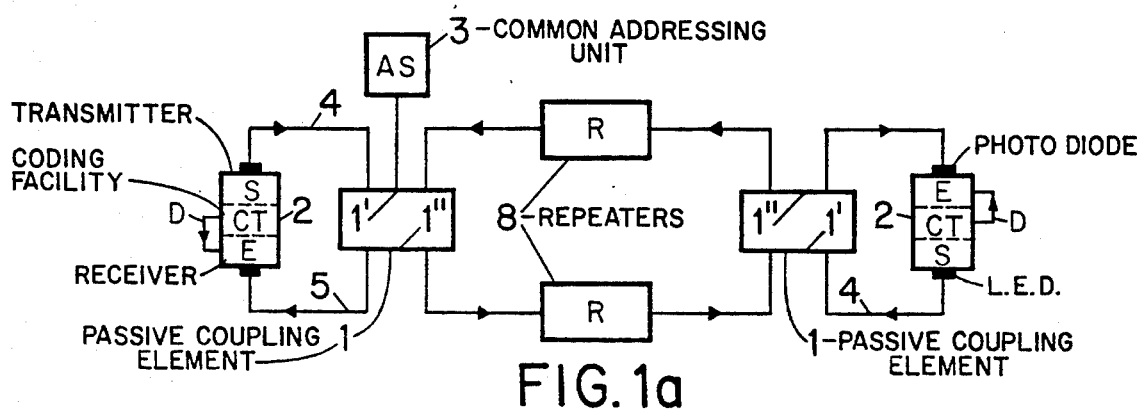
FIG. 1a is a block diagram showing a fibre network having groups of stations coupled by a plurality of passive coupling elements in accordance with the invention.

If the locations of the various subscriber stations tend to be concentrated in groups, (FIG. 1a) these groups can be brought together in separate networks with their own coupling elements at the junction points. The individual coupling elements are then linked to each other by fibre conductors, although these links will need to incorporate repeaters 8, particuralarly with a relatively large number of subscriber stations, i.e. higher losses in the central coupling elements.

The structure of the network described is simple and straightforward. If one subscriber station fails, only the links connected to it are interrupted, while traffic between all the other stations can continue unhindered. Fibre bundles can also be used instead of single fibres. Breakage of a fibre then has practically no effect on the quality of transmission. The fibre network can be freely extended to include a considerable number of subscriber stations (e.g. 50–100).

With modern low-attenuation multi-mode fibres, the transmission attenuation occuring in fibre networks extending up to about 1 km can easily be overcome with the transmitting power of the individual subscriber stations, and therefore no repeaters are required. With the proposed star-shaped network, if one subscriber station fails, only the links connected to this station are affected, while traffic between the other stations continues unhindered. Coupling the fibre conductors optically to the subscriber stations by means of a simple, passive coupling element represents a substantial reduction in cost, compared to the earlier arrangement with repeaters.

What we claim is:

1. A fibre network for optoelectronic transmission of data, comprising:

a plurality of subscriber stations;

each station including an optical information transmitter, an optical information receiver and coding facility means for recognizing a specific one of a plurality of address codes;

common addressing means for addressing said subscriber stations by periodically transmitting the address codes of said stations whereby the transmitter of the addressed subscriber station transmits information to the remaining said stations;

a passive optical coupling element, said coupling element comprising a solid light-conducting core having a pair of opposing first and second end faces, said first and second end faces being devoid of an anti-reflective coating;

each transmitter of each of said stations and of said common addressing means optically connected to a first end of a different one of a first group of individual light-conducting fibres, a remaining end of each of said first group of fibres being optically connected to said first end face of said coupling element;

each receiver of each of said stations optically connected to a first end of a different one of a second group of individual light-conducting fibres, a remaining end of each of said second group of fibres being optically connected to said second end face of said coupling element;

said addressing means being optically coupled to a first end of an individual light conducting fibre, the remaining end of said light conducting fibre being optically coupled to said first end of said coupling element;

said coupling element having a length between said first and second end faces selected to cause an active surface area of all of said fibres coupled to said second end face to be fully illuminated by optical energy emanating from said remaining end of any one of the fibres coupled to said first end of said coupling element, whereby transfer of optical information between any pair of stations is accomplished without transferring the information through said common addressing means.

2. A fibre network as claimed in claim 1, wherein each said receiver is adapted to receive optical radiation containing both information and said address code; said common addressing means optoelectronically transmitting said address codes through said coupling element and along each of said second group of fibres to each of said plurality of receivers; each of said plurality of receivers being adapted to be decoupled from its associated fibre in said second group of fibres when the transmitter of the associated station commences operation.

3. A fibre network as claimed in claim 1, wherein each of said coding facility means includes means for enabling the transmitter of its associated station upon receipt and recognition of the specific address code associated with said station.

4. A fibre network as claimed in claim 1, wherein each said transmitter comprises a light-emitting diode.

5. A fibre network as claimed in claim 1, wherein each said receiver comprises a photo-diode detector.

6. A fibre network as claimed in claim 1, wherein all of said remaining fibre ends are optically connected to said first end of said coupling element; said coupling element further comprising a mirror on the surface of said second end face to reflect optical energy from any one of said fibre ends to all other fibre ends.

7. A fibre network as claimed in claim 6, wherein said second end face and said mirror are slightly dished inward with increasing radius to decrease the loss of optical energy transferred between fibres in said coupling element.

8. The fibre network as claimed in claim 1 and further including:
a second plurality of subscriber stations;
each of said second plurality of subscriber stations comprising an optical transmitter, an optical receiver and a coding facility for recognizing a specific one of a second plurality of address codes, the transmitter of each of said second plurality of subscriber stations being adapted to transmit information when that address code associated with said transmitter is recognized by the coding facility associated with said transmitter;
a second passive optical coupling element comprising a solid light-conducting core having a pair of opposing first and second end faces being devoid of any anti-reflective coating;
an addressing means also for addressing said second plurality of subscriber stations by periodically transmitting the address codes of said second plurality of subscriber stations;
each transmitter of each of said second plurality of subscriber stations optically connected to a first end of a different one of a third group of individual light-conducting fibres, a remaining end of each of the fibres in said third group of fibres being optically connected to said first end face of said second coupling element;
each receiver of each of said second plurality of subscriber stations optically connected to a first end of a different one of a fourth group of individual light-conducting fibres, a remaining end of each of said fourth group of fibres being optically connected to said second end face of said second coupling element;
said first end face of said first coupling element being optically coupled to a first end of an individual light-conducting fibre, the remaining end of said light-conducting fibre being optically connected to said second end face of said second coupling element;
said second end face of said first coupling element being optically coupled to a first end of an individual light-conducting fibre, the remaining end of said light-conducting fibre being optically connected to said first end of said second coupling element;
said first and said second coupling element having a length between there first and second end faces selected to cause an active surface area of all of said fibres coupled to said second end face of each said coupling element to be fully illuminated by optical energy emanating from said remaining end of any one of the fibres coupled to said first end of said coupling elements whereby transfer of optical information between any pair of stations is accomplished without transferring the information through said common addressing means.

9. A fibre network as claimed in claim 8, in which at least one of the fibres linking said first and second coupling elements includes a repeater to compensate for losses in said first and second coupling elements.

10. A fibre network as claimed in claim 8, wherein said first and second coupling elements comprise first and second glass cores, respectively, each of said cores having opposing first and second end faces corresponding to said first and second end faces of said coupling element; said end of each said fibre coupled to said coupling elements being optically matched to the end face of the glass core to which it is coupled to minimize the transfer of optical energy between said fibre and said core.

11. A fibre network as claimed in claim 10, wherein the length between said opposed first and second end faces of each said glass core is selected to cause the optical energy emanating from any fibre optically coupled to one of said end faces of said core to be substantially uniformly distributed among all the fibres optically coupled to the other end face of said core.

12. A fibre network as claimed in claim 10, wherein each said coupling element further includes means on an exterior surface of each said core between said end faces of each said core for reflecting into said core any optical energy outwardly directed to said core exterior surface to minimize optical energy losses in said coupling element.

13. A fibre network as claimed in claim 10, wherein each said coupling element further comprises a glass coating deposited upon an exterior surface of its associated glass core between said end faces of its associated glass core, said glass coating having a refractive index less than the refractive index of the glass forming said core, thereby to minimize optical energy loss within said coupling element.

14. A fibre network as claimed in claim 10, wherein at least one of said first and second end faces of said coupling element is dished slightly inward with increasing radius 15. A fibre network for optoelectronic transmission of data, said network having N junction points, where $N \geq 1$, comprising:
a plurality of subscriber stations;

each station including an optical information transmitter, an optical information receiver, and coding facility means for recognizing a specific one of a plurality of address codes;

common addressing means for sampling the addressing said subscriber stations by periodically transmitting the address codes of said stations whereby the transmitter of the addressed subscriber station transmits information to the remaining stations;

at least one passive optical coupling element, each coupling element defining one of said junction points of said network; each said coupling element comprising a solid light-conducting core having a pair of opposing first and second end faces, said first end face being devoid of an antireflective coating, said second end face having a substantially completely reflective coating, to form a mirror surface thereon;

a plurality of individual light-conducting fibres;

the first end of each of said plurality of fibres being optically connected to said first end face of said coupling element;

a remaining end of each of said fibres being split into first and second end portions, each said first and second end portion being respectively optically connected to the transmitter and the receiver of one of said plurality of stations;

each said coupling element having a length between said first and second end faces selected to cause optical energy emanating from the first end of any one of the fibres to fully illuminate all of the remaining fibre first ends, whereby transfer of optical information between any pair of stations is accomplished without transferring the information through said common addressing means.

16. A fibre network as claimed in claim 15, wherein said second end face is slightly dished inward with increasing radius to concentrate the energy reflected from said mirror surface onto the remaining fibre first ends to reduce the optical energy losses in said coupling element.

* * * * *